United States Patent [19]

Sugawara

[11] Patent Number: 5,078,472

[45] Date of Patent: Jan. 7, 1992

[54] DRIVING DEVICE FOR AN OPTICAL SYSTEM

[75] Inventor: Kenji Sugawara, Tokyo, Japan

[73] Assignee: Kabushiki Kaisha Shinkawa, Tokyo, Japan

[21] Appl. No.: 523,397

[22] Filed: May 14, 1990

[30] Foreign Application Priority Data

May 15, 1989 [JP] Japan .................................. 1-118596

[51] Int. Cl.⁵ .............................................. G02B 7/02
[52] U.S. Cl. ................................ 359/824; 354/195.12; 354/402; 359/694
[58] Field of Search ................ 350/429, 255; 354/402, 354/400, 404, 195.12; 310/12, 13, 14

[56] References Cited

U.S. PATENT DOCUMENTS

| | | | |
|---|---|---|---|
| 4,534,624 | 8/1985 | Toda et al. | 350/429 |
| 4,605,286 | 8/1986 | Sumi | 350/429 |
| 4,676,605 | 6/1987 | Toda et al. | 350/429 |
| 4,828,360 | 5/1989 | Maruyama | 350/255 |

Primary Examiner—Loha Ben
Attorney, Agent, or Firm—Koda & Androlia

[57] ABSTRACT

A drive mechanism for an optical system, in which focusing and zooming, etc. are performed by moving movable lenses of a lens group made up with movable lenses and fixed lenses so as to adjust a distance between the lenses, includes a guide which linearly guides the movable lenses and a linear type magnetic driver which directly drives a retainer for retaining the movable lenses.

2 Claims, 2 Drawing Sheets

DRIVING DEVICE FOR AN OPTICAL SYSTEM

BACKGROUND OF THE INVENTION

1. Field of the Invention

The present invention relates to a driving device for an optical system and more particularly to a driving device which performs focusing and zooming, etc. on manufactured products in an optical inspection system.

2. Prior Art

In conventional optical systems which execute inspection of manufactured products, the functions of focusing and zooming, etc. are performed by moving movable lenses of lens group (which is made up with fixed lenses and movable lenses) so as to alter the distance between the movable lenses and fixed lenses.

In this case, electrical driving device is used which transmits the rotary force of a small motor to a feed screw mechanism via gear train so that a retaining assembly which holds the movable lenses in moved along linear guide path.

In this prior art, since a mechanism which converts the rotation of the electric motor into linear motion is required, the operating speed is somewhat limited. Thus, such a conversion mechanism is inappropriate for use in optical systems when a high-speed operation or a high-speed response is required.

In addition, since the lenses cannot be accurately positioned due to backlash in the mechanism, etc., a sharp image cannot be obtained. Moreover, when high-frequency operation is continued for a considerably long period of time, the useful life of the system is shortened.

SUMMARY OF THE INVENTION

Accordingly, the object of the present invention is to provide a driving device for an optical system which allows high-speed operation and accurate positioning in photographing.

In addition, another object of the present invention is to provide a driving device which is compact and lightweight, having a long useful life.

The above-described objects of the present invention are accomplished by providing (a) guide means which linearly (along optical axis) guides the movement of the movable lens retaining assembly and (b) a linear magnetic driving means which directly drives the retaining assembly.

When the driving device of the present invention is mounted, for example, on a photographing system which is used to photograph and recognize a manufactured product for inspection purpose, the application of electric-current commands to the linear magnetic driving means causes the movable lens retaining assembly to move linearly as a result of magnetic action of the driving means.

When the camera focuses the object product, a signal indicating the focusing is received by a system controller so that the linear magnetic driving means is driven via electric-current command and the movable lenses are maintained at a fixed position.

DETAILED DESCRIPTION OF THE INVENTION

The present invention will be described below with reference to the accompanying drawings.

Figure 1:
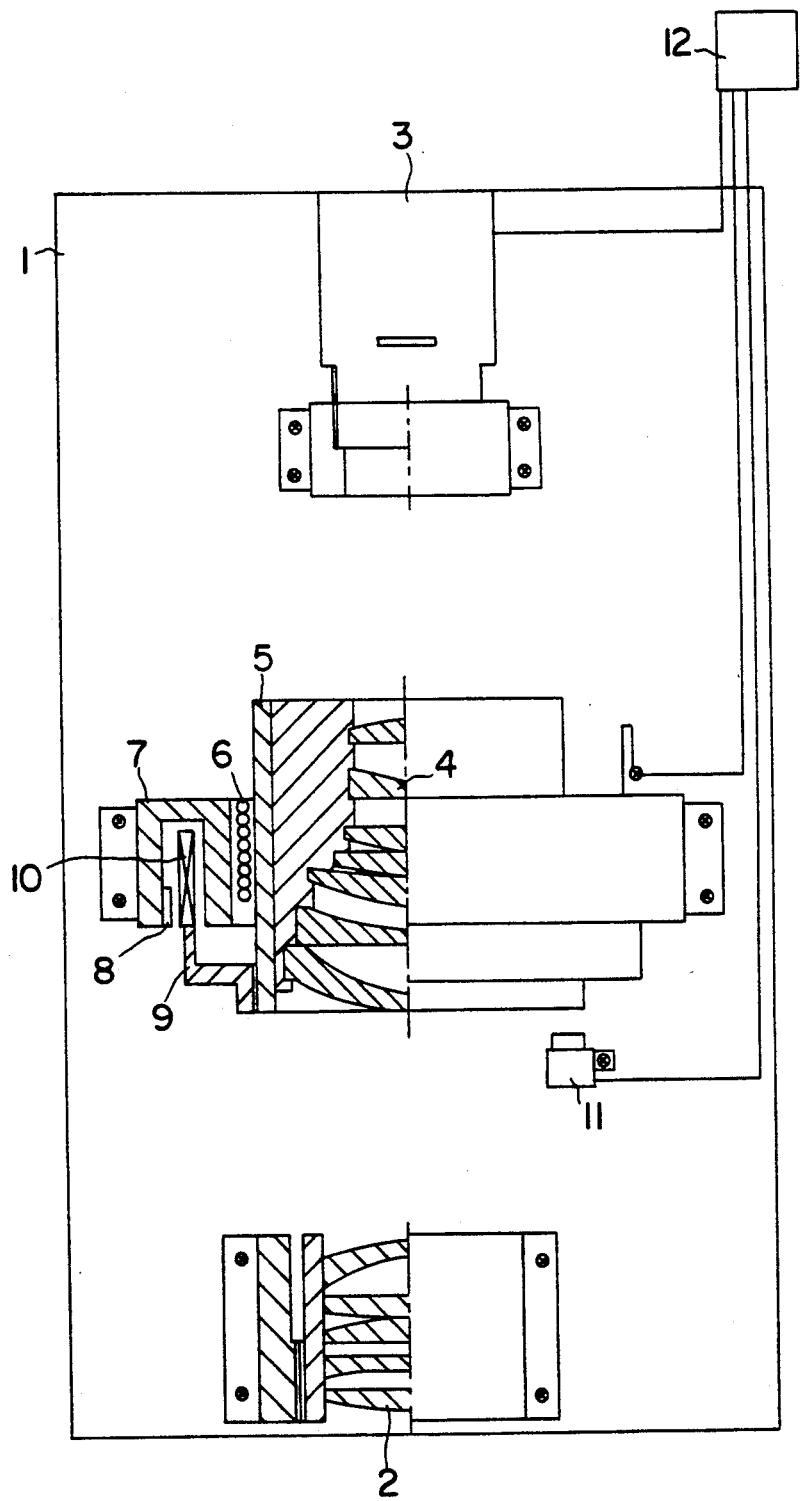
FIG. 1 is a partially cross-sectional front view of one embodiment of the driving device of the present invention used in an optical system.

As seen in FIG. 1, an objective lens group 2 and a photographing camera 3 are provided on optical system head 1 so that the objective lens and the camera are positioned on the same optical axis. The objective lens group 2 is provided at the lower end of the head 1 and the camera 3 is at the top end in the drawing.

A movable lens group 4 is installed in an intermediate section of the head 1 in a manner that the movable lens group 4 is positioned on the same optical axis as the objective lens group 2 and the camera 3.

The movable lens group 4 is retained in a lens tube (retaining assembly) 5. The lens tube 5 is linearly guided along the optical axis via, for example, a direct-acting ball slide 6, which is called a linear movement guide in the specification. The linear movement guide is not limited to the contact type (which is the ball slide 6 mentioned above) shown in the drawing: for example, a guide of non-contact type which uses static-pressure bearings (which uses air pressure) can be used.

A magnetic-path assembly 7 which is U-shaped in cross section and made of a magnetic material is provided on the outer tube of the direct-acting ball slide 6, and a permanent magnet 8 is installed at the front end of the magnetic-path assembly 7.

A yoke 9 is provided on the lens tube 5, and a voice coil 10 is installed on the yoke 9. The voice coil 10 is positioned in the space within the magnetic-path assembly 7.

The movement of the lens tube 5 is detected by a positional proximity sensor 11.

The camera 3, voice coil 10 and positional proximity sensor 11 are connected to a controller 12 which performs an operational control of the driving device.

Figure 2:
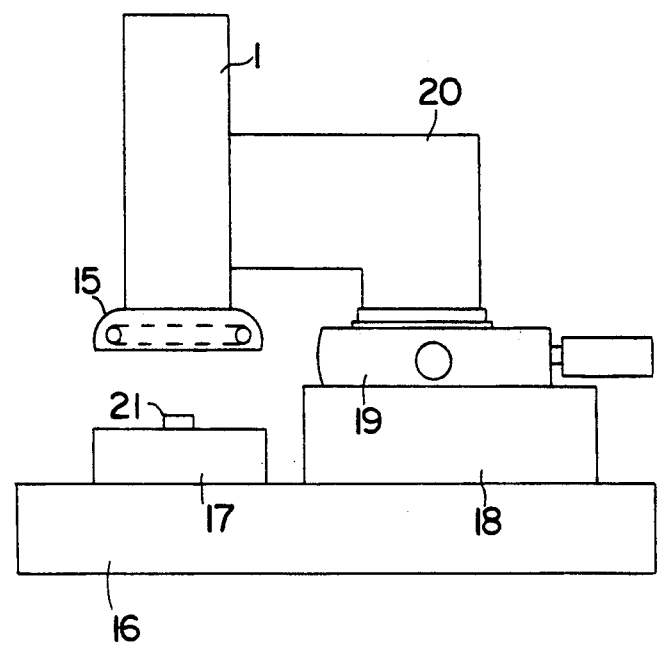
FIG. 2 illustrates a product inspection device using the optical system driving device of the present invention.

FIG. 2 illustrates a product inspection device which uses the optical system driving device of the present invention.

A ring illuminator 15 is installed at the bottom of the optical system head 1. In particular, the ring illuminator 15 is positioned underneath the objective lens group 2. The optical system head 1 is positioned above the sample table 17 which is provided on a base 16. A rotary table 18 is provided on the base 16, and on the rotary table 18 is provided an X-Y table 19. The X-Y table 19 has an arm 20, and the optical system head 1 is fixed to this arm 20.

In operation, when a sample (manufactured product) 21 is placed on the sample table 17, and the system is ready to photograph and recognize this sample via the camera 3, an electric-current command is sent to the voice coil 10 from the controller 12 so that the lens tube 5 is caused to move linearly along the optical axis of the camera 3 as a result of magnetic action caused by the voice coil 10 and permanent magnet 8.

When the sample 21 is focused by the camera 3 as a result of such movement of the lens tube 5, a signal of such focusing is received by the controller 12, and the controller 12 controls the electric-current commands being sent to the voice coil 10 while reading the deviation signals sent from the positional proximity sensor 11.

Thus, the lenses in the movable lens group 4 are kept at a fixed (focussed) position.

As described above, the optical system driving device of the present invention includes (a) a guide means which linearly guides the movable lens retaining assembly which holds the movable lenses therein, and (b) the linear magnetic driving means which directly drives the retaining assembly. The present invention provides the following advantages:

1. The mechanism is smaller than conventional devices and has a longer useful life. Especially, when non-contact type guide is used as the direct-acting guide means, any mechanical contact is eliminated and the useful life becomes almost permanent.

2. Since no converting means which mechanically converts the rotational motion (of a motor) to linear motion is used, the inspection device can work at high speed.

3. Since less mechanical components are used, the driving device can be compact and light-weight, thus being ideal for compact optical systems.

4. Accurate positioning can be accomplished by introducing a servo system into the movable lens positioning control means.

I claim:

1. A driving device for an optical system which comprises a camera, a movable lens group and an objective lens group installed on an optical system head and aligned on a common optical axis, said movable lens group provided in a retaining assembly being installed between said camera and said objective lens group, wherein said driving device further comprises:
   a magnetic path assembly provided on said optical system head and next to said retaining assembly;
   a permanent magnet provided on said magnetic path assembly;
   a yoke provided on said retaining assembly;
   a voice coil provided at an end of said yoke so that said voice coil is positioned in a space formed in said magnetic path assembly; and
   a guide provided between said magnetic path assembly and said retaining assembly so as to guide said retaining assembly in a direction of said opticcal axis.

2. A driving device for an optical system which comprises a camera which outputs a focus signal indicative of a focus condition of said camera, a movable lens group and a fixed objective lens group installed on an optical system head and aligned on a common optical axis, said movable lens group provided in a retaining assembly being installed between said camera and said objective lens group, wherein said driving device further comprises:
   a magnetic path assembly provided on said optical system head and next to said retaining assembly;
   a permanent magnet provided on said magnetic path assembly;
   a yoke provided on said retaining assembly;
   a voice coil provided at an end of said yoke so that said voice coil is positioned in a space formed in said magnetic path assembly;
   a guide provided between said magnetic path assembly and said retaining assembly so as to guide said retaining assembly in a direction of said optical axis;
   a proximity sensor provided adjacent to said movable lens group for outputting a position signal indicative of a position of said movable lens group; and
   a control means for supplying an electric signal to said voice coil in response to said position signal and said focus signal for causing said movable lens group to move to and stay at a position wherein said camera is focused.

* * * * *